Dec. 20, 1966     A. L. WELCH     3,292,455
TRANSMISSION
Filed March 11, 1965     2 Sheets-Sheet 1
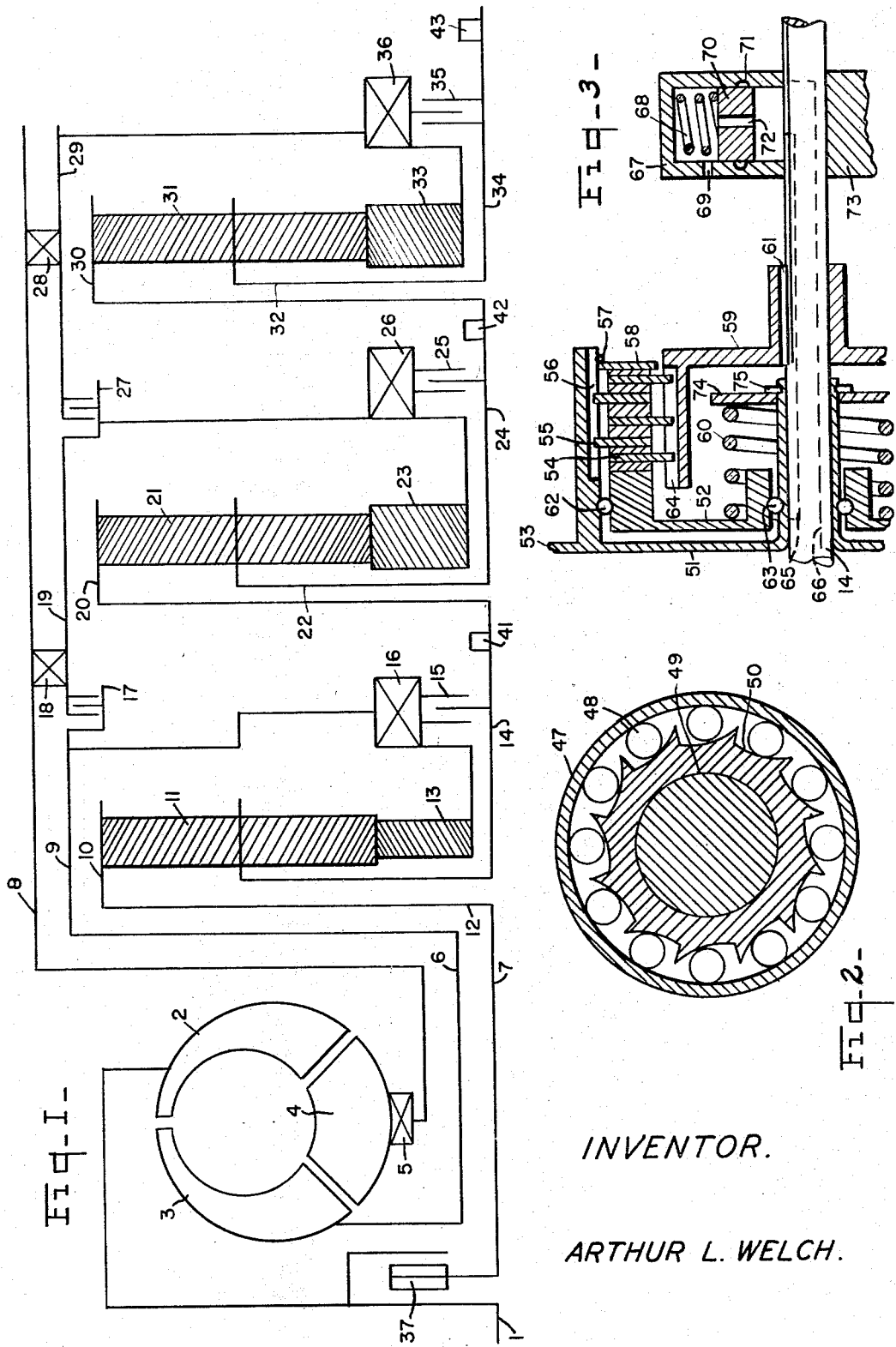
INVENTOR.
ARTHUR L. WELCH.

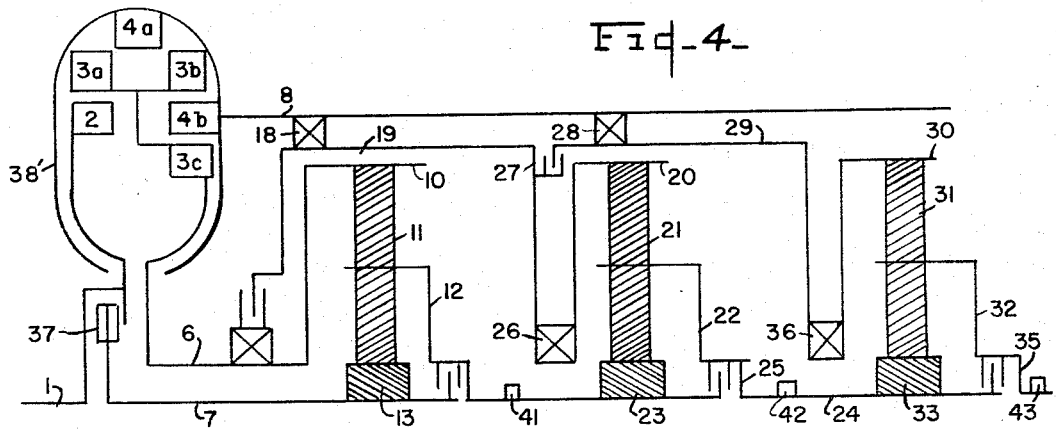
Fig-4-
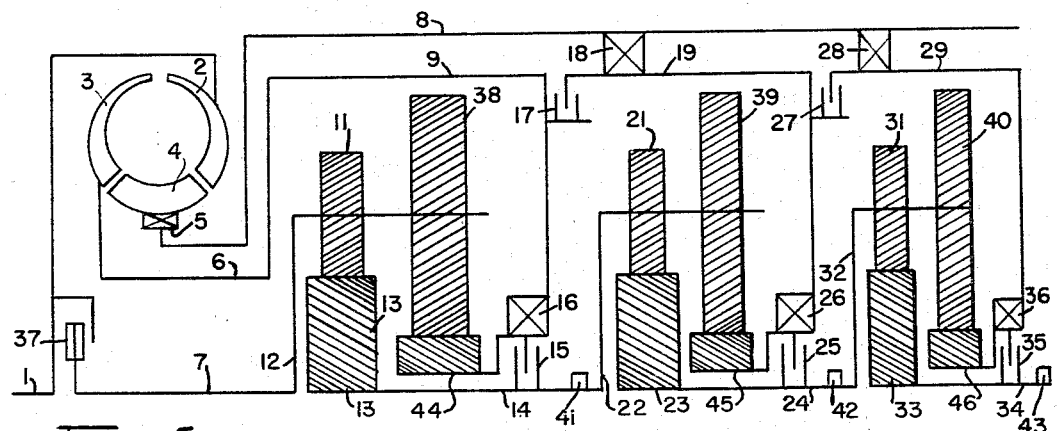
Fig-5-
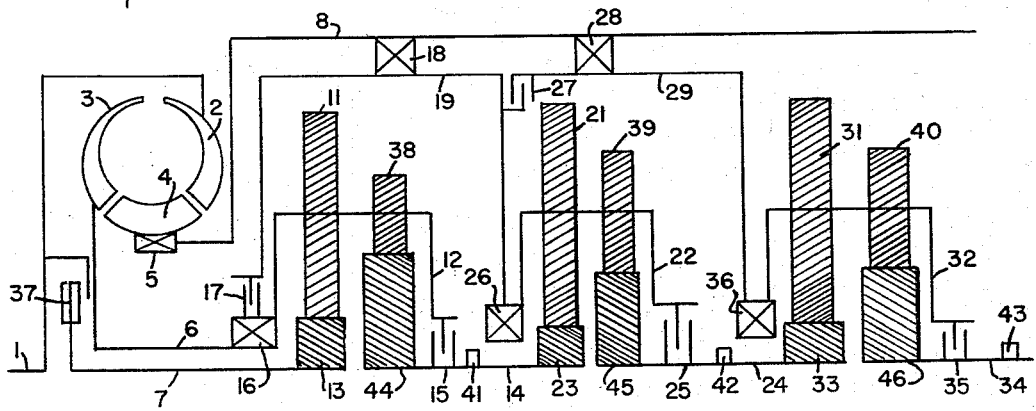
Fig-6-
INVENTOR.
ARTHUR L. WELCH.

United States Patent Office 3,292,455
Patented Dec. 20, 1966

3,292,455
TRANSMISSION
Arthur L. Welch, Box 731, Wasilla, Alaska 99687
Filed Mar. 11, 1965, Ser. No. 439,050
7 Claims. (Cl. 74—688)

This invention relates to a hydrodynamic and planetary split torque transmission having a wide range of ratios varying infinitely from maximum reduction to direct drive. This application is a continuation-in-part of my presently pending patent application #282,011, now abandoned, filed May 21, 1963, in the United States Patent Office.

The transmission is comprised of a hydraulic torque converter and a plurality of planetary gearsets arranged in series with parallel hydraulic and mechanical power trains arranged with suitable actuating and control means to transmit power either highly multiplied or in direct drive or in an infinitely variable number of ratios between maximum reduction and direct drive according to the needs of the device employing the transmission.

The hydrodynamic transmission best suited for use with the transmission of this invention is known as a hydraulic torque converter. Torque converters are presently known in several types: automotive single stage employing rotatable reaction means, industrial single stage employing fixed reaction means, and industrial three stage employing fixed reaction means.

It is an object of this invention to provide gear arrangements adapted to best employ the features of all the above torque converters.

In planetary gearsets as in any transmission employing gears to effect a reduction of speed between a driving and a driven shaft there is a transmission input member, a transmission output member, and a transmission reaction member. It is a peculiarity of planetary gearsets that the various components such as sun gear, ring gear, and pinion gear carrier of the hypo-epicycloidal arrangement and the components such as double sun gears, stepped pinion gears and carrier of the epi-cycloidal arrangement can interchange in the functions of input member, output member, and reaction member.

It is an object of this invention to employ the various gear arrangements and the various torque converters in a unique and advantageous manner in a transmission having a wide range of applications.

As long as the output member rotates in a forward direction, it is a further peculiarity of planetary gearsets that if the reaction member is turned a fraction of a turn while the input member is turned one turn, the number of turns of input required to effect one turn of output member decreases, in other words the ratio between input and output members decreases.

The main virtue of hydraulic torque converters is the inherent multiplication of the input torque as it emerges as output torque. This torque multiplication of torque converters decreases as the output speed of the driven shaft approaches the input speed of the driving shaft. In planetary gearsets the decrease in gear ratio which occurs when the reaction member is accelerated in relation to a constant input member speed is at a rate which very closely matches the torque multiplication decrease in torque converters. It follows that a torque converter can be used to turn the reaction member of a planetary gearset. It also follows that when torque converter and planetary gearset are properly matched to the power source and need at hand an infinite range of ratios from maximum reduction to direct drive will result. When such a transmission method is used it is called "split torque" or "dual path" drive. It is an object of this invention to use this split torque transmission method to great advantage.

This invention comprises a mechanical power train employing a plurality of planetary gearsets arranged in coaxial alignment and housed in a transmission case designed and constructed to maintain that alignment, and a hydraulic power train including a hydraulic torque converter and an actuating mechanism surrounding and coaxial with said mechanical power train. The planetary gearsets are connected in series from front to rear of the transmission with a driving shaft of a power source transmitting power to the front gearset input member, and with the front gearset output member connected to the following gearset input member, and with any following gearsets connected in like manner, output member of preceding gearset connected to following gearset input member, and with a transmission output means connected to the last gearset output member. Each gearset is surrounded by a drum shaped device connected by a preferred embodiment of a one way clutch to the associated gearset reaction member. All except the first such reaction drum devices are connected by another preferred embodiment of a one way brake to the inside of the transmission case. These one way clutches and brakes prevent rearward rotation of the associated gearset reaction members, except that the front reaction drum is connected to a sleeve shaft output means of the hydraulic torque converter. Said sleeve shaft surrounds the driving shaft extension which transmits power to the front gearset input member and transmits the power output of the torque converter to the front gearset reaction member. It can thus be seen that the front gearset is operating in split torque drive with the following gearsets operating in mechanical drive at a speed determined by multiplying the individual gearset reduction ratio by the number of gearsets, except the front one. In starting position all power transmitted to the torque converter is wasted. However the torque converter will ordinarily start the front gearset reaction member very quickly and accelerate it according to the load to direct drive or matched speed of front gearset input member driving shaft and torque converter output sleeve shaft. A preferred embodiment of a hydraulically operated multiple disc clutch is provided between two members of each gearset and between the adjacent ends of each pair of reaction drums. A centrifugally operated hydraulic governor as a preferred embodiment for fully automatic control of the transmission is provided on the output shaft of each gearset. The front governor admits oil at a predetrmined speed, ordinarily at or near direct drive, to the clutches associated with the front gearset, locking the gearset in direct drive and connecting the following gearset reaction apparatus to the torque converter drive train. This effects direct drive in the front gearset, which has just been accelerated through an infinite range of part mechanical—part hydraulic torque multiplying ratios, and split torque drive in the following gearset. This second gearset will ordinarily be rapidly accelerated through an infinite range of part mechanical and part hydraulic torque multiplying ratios to direct drive whereupon the hydraulic governor riding on this second gearset output shaft will admit oil to the associated clutches, creating split torque drive in the following third gearset. The third gearset will ordinarily also be accelerated through an infinite range of part mechanical and part hydraulic drive ratios to direct drive. Any number of gearsets can follow the third gearset and will operate in like manner. The one way clutch named as a preferred embodiment for holding means between the reaction member and the reaction drum and the one way brake between the reaction drum and the transmission case has the virtue of easy control because it prevents rearward rotation of any device into which it is incorporated, yet allows instant and free forward rotation of the device upon demand. Those skilled in the art will readily see that it is possible and might be desirable to use disc clutches or bands as a holding means in the reaction system and hydraulic drive train. Since no multiple disc clutch in the transmission is ever required to transmit more than prime mover power all clutches are of a similar capacity and can be of a relatively small size. In the changing action to direct drive in one gearset and to split torque drive in the following gearset no change of gear ratio is involved, the action being an infinite range of continuous and steadily changing ratios part mechanical and part hydraulic from maximum reduction in starting position to direct drive.

The split torque principle of power transmission has long been known. It was originally invented to increase the efficiency of fluid couplings and, later, early torque converters. With improved hydrodynamic transmissions and higher speed prime movers any efficiency gained in a torque converter—single gearset split torque drive was offset by the added cost of the planetary gearset, so the system never became popular. Within recent years the split torque drive has been employed in heavy construction equipment to increase the efficiency and flexibility of low speed high torque diesel engines. In the automotive field the split torque drive has been revived to increase the efficiency and flexibility of so called automatic transmissions in automobiles. There remains the relatively untouched field of automatic transmissions for highway trucks of large size.

It is an object of this invention to provide improved transmissions suitable for all these needs.

As stated above all the power transmitted to a hydraulic torque converter is wasted until the output shaft starts to turn. In transmissions starting with the power source running at idle speed most of the power will be transmitted mechanically to the front gearset input member because torque converters require very little power at low input speed. Therefore the transmission of this invention will yield considerably better efficiency at starting speed than transmissions employing gears driven by torque converters in pure hydraulic drive. The maximum efficiency of torque converters operating in torque multiplying drive is about 80%. The efficiency of a planetary gearset is near 98%. In a split torque drive transmitting half the available power mechanically and half the power hydraulically it can be seen that the overall operating efficiency will be increased to about 90%.

These and other objects will become more apparent in the following description.

In the drawings FIGURES 1–4–5 and 6 show schematically the various gear arrangements and the various torque converter hydraulic circuit configurations. Parts having similar locations are similarly numbered in the different figures. FIGURE 2 shows the operating parts of a one way clutch. FIGURE 3 shows a cross section of a hydraulically operated multiple disc clutch and the controlling governor.

In FIG. 1 the torque convetrer hydraulic circuit shown is that of the automotive type single stage torque converter having a power input or driving shaft 1 which will ordinarily be the crankshaft of an internal combustion engine not shown. Shaft 1 drives the torque converter pump or impeller 2 which pumps oil into the turbine 3, said turbine 3 being juxtaposed with impeller 2 to form a toroidal shaped chamber open at the bottom. This open bottom is closed by stator or reactor 4. The toroidal shape of the chamber is formed by the similarly arcuately shaped and oppositely arranged walls of impeller 2 and turbine 3. Generally radially straight vanes 2 having arcuately shaped rear edges which closely fit the curvature of the impeller 2 wall are attached to the impeller 2 wall and form passages through which hydraulic fluid, generally oil, can pass in an outward direction when impeller 2 is rotated. Another set of vanes also arcuately shaped to fit the curvature of turbine 3 wall are attached to the inner wall of turbine 3. These turbine 3 blades are curved along their radial length, generally having their ends somewhere near the radial axis of said turbine 3. The curvature along their length is positioned away from the radial axis of the turbine 3, on the side toward which the turbine 3 rotates. This curvature forms a bucket or pocket into which oil can be thrown by the impeller 2 blades which are slanted radially backwards to faciiitate pumping of hydraulic fluid. It is a pecularity of centrifugal pumps that they absorb driving power at a rate that is squared as the speed of rotation increases. It can be seen therefore that at low speeds the torque converter will absorb very little power. As the fluid emerges from the inner ends of the turbine blades 3 it is traveling in a direction backwards from the impeller 2. The reactor means or stator 4 is positioned in the space left open at the bottom of the toroidal chamber formed by impeller 2 and turbine 3. Axially positioned blades or vanes project radially outward from the stator 4 hub. These vanes are curved along their length in a manner which directs the hydraulic fluid into the inner ends of the impeller 2 blades, in a manner best suited to prevent cavitation. When the turbine 3 is either stopped or turning at a slower speed than impeller 2, the fluid thrown out of impeller 2 strikes turbine 3 blades at a sharp angle, exerting considerably more force on the blades 3 than when the turbine 3 is turning at a speed nearly matching the speed of impeller 2. The extra force exerted against the turbine 3 blades causes an increase in the torque exerted against the turbine output shaft 6 by the turbine 3. The multiplication runs as high as three times the torque put into the impeller 2 by driving shaft 1. Since the fluid being redirected by stator 4 exerts force against the stator 4 vanes the stator 4 tends to rotate backwards. It is prevented from reverse rotation by freewheel 5 positioned between stator 4 and transmission case 8. This freewheel 5 prevents reverse rotation, yet allows instant and free forward rotation when turbine 3 speed exceeds 85% of impeller 2 speed and the fluid emerging from the inner ends of turbine 3 blades in a more forward flowing direction and strikes the back sides of stator 4 blades, exerted force which causes stator 4 to rotate forwardly with impeller 2 and turbine 3. The combined hydraulic circuit then performs as a simple fluid coupling, transmitting torque put into impeller 2 through turbine 3 at about a one to one ratio. Certain industrial type single stage torque converters have a stationary stator 4 which is anchored to the transmission case 8. These industrial type single stage torque converters are designed for lower speed prime movers, and generally operate in torque multiplying hydraulic drive or in direct drive provided by a mechanical clutch means if so desired.

The gear arrangement of the planetary gearsets in FIG. 1 is the time honored hypo-epicycloidal arrangement of ring gears 10–20–30 as input members, pinion gear carriers 12–22–32 as output members, and sun gears 13–23–33 as reaction members. The gear ratio of the individual gearsets is limited to a range of less than 1.75 turns of the ring gear to one turn of the pinion carrier, because of construction factors. In a gearset of 1.6 turns ring gear to one turn of the pinion carrier the pinion gears are very small, though still practical. With three gearsets of 1.6 to one ratio, maximum starting ratio is about 4 to one in the mechanical power train. Since the torque multiplication of single stage torque converters is relatively low, the gear ratios available from the ring gear input, sun gear reaction arrangement are best adapted to said single stage torque converters.

In FIG. 4 the torque converter configuration is that of the three stage industrial torque converter having input shaft 1 driving pump or impeller 2 which is surrounded by the first stage of turbine wheel 3a. The reactor or stator 4a first stage follows turbine stage 3a, and is immovably attached to the inside of torque converter case 38' which is always stationary. Turbine second stage 3b follows reactor first stage 4a, and is followed in turn by reactor second stage 4b followed by turbine third stage 3c. The vanes or blades of the turbine 3abc and reactor 4ab are all airfoil shaped to offer least resistance to passage of hydraulic fluid and form bucket shaped devices adapted to absorb power from said hydraulic fluid as it passes. Impeller 2 also has airfoil shaped blades positioned with a backwards slant from the direction of impeller 2 rotation and therefore displace or throw hydraulic fluid outward in the manner of any centrifugal pump. Turbine first stage 3a blades absorb part of the power being transmitted by said hydraulic fluid and direct it in a direction opposite to impeller 2 and turbine 3 rotation. Reactor first stage 4a blades are positioned to redirect the hydraluic fluid into a forward flowing direction whereupon it enters turbine second stage blades 3b and again reverses direction. Reactor blades 4b again redirect the hydraulic fluid into a forward flowing direction whereupon it enters turbine third stage blades 3c and passes through into the eye of the hydraulic circuit. The fluid then reenters impeller 2 blades and starts the circulatory path again. When turbine 3abc is rotating at a lower speed than impeller 2 the hydraulic fluid strikes turbine blades 3abc at a sharper angle and exerts more force on said blades than when they are turning faster. The accumulation of torque in the three turbine stages 3abc amounts to as much as six times the torque put into turning impeller 2. It has been said that when the hydraulic fluid is circulating faster in a torque converter around a radial path through the torque converter than it is either being carried in the case of the automotive single stage rotating housing torque converter or is being circulated around a circumferential path in the case of the stationary housing single stage and three stage industrial torque converters that torque multiplication prevails.

The gear arrangement of FIG. 4 is also the hypo-epicycloidal configuration except with sun gears 13, 23 and 33 as gearset input members, carriers 12, 22, and 32 as gearset output members, and ring gears 10, 20, and 30 as gearset reaction members. The ratios obtained in the individual gearsets of this arrangement by holding the reaction member stationary and turning the input member enough revolutions to obtain one turn of the output member are limited to no lower than 2.5 turns input to one turn output because of construction difficulties. Therefore when using three gearsets the minimum starting ratio of the mechanical power train is about 15 turns input to one turn output. Because of the low gear ratios involved with this gear arrangement of FIG. 4 the high torque multiplication ratios obtained in the three stage torque converter are best adapted to said gear arrangement.

Because of the ratio limitation of the hypo-epicycloidal gear arrangements a gap exists in the ratio range of the individual gearsets between 1.75 to one and 2.5 to one, a range that might be very desirable. In the epicycloidal gear arrangements of FIG. 5 and FIG. 6 any gear ratio desired may be had.

In FIG. 5 the torque converter configuration is that of the automotive single stage. The gear arrangement is the double sun gear, stepped pinion gear epicycloidal type having driven sun gears 13, 23, and 33 as gearset output members, reaction sun gears 44, 45, and 46 as transmission reaction members, and carriers 12, 22, and 32 as gearset input members, said carriers having reaction pinion gears 11, 21, and 31 meshing with reaction sun gears 44, 45, and 46 and integrally attached to driving pinion gears 11, 21, and 31 which mesh with driven sun gears 13, 23, and 33.

In FIG. 6 the sun gears 13, 23, and 33 are gearset input members, the driven sun gears 44, 45, and 46 are gearset output members, and the carriers 12, 22, and 32 having driven pinion gears 11, 21, and 31 meshing with driving sun gears 13, 23, and 33 and integrally attached to driving pinion gears 38, 39, and 40 which mesh with driven sun gears 44, 45, and 46 act as gearset reaction members. The torque converter configuration is also that of the single stage automotive type.

The well known freewheel of FIG. 2 is also known as a one way clutch if it is performing a driving function, or a one way brake if it is performing a holding function, and is known in many forms. All forms have the same virtue, namely the ability to hold or drive a device in one direction, yet allow instant and free rotation of the device in the other direction upon demand. The oldest type as shown in FIG. 2 has a circular outer race 47 housing a plurality of cylindrical rollers 48 arranged between the inclined planes 50 of an inner race 49, which is the driving or holding member. Any movement of said inner race 49 in a direction where the foot of the inclined planes 50 advances toward the rollers 48 causes the rollers 48 to climb the inclined planes 50 and wedge between the outer race 47 and said inclined planes 50 to lock the various parts into an integral unit, yet allows the outer race 47 and any mechanism into which it is incorporated to freely overrun inner race 49. The freewheel unit may also take the form of tiltable sprags held in spaced relationship between circular inner and outer races. When driven in one direction the sprags tilt, causing a wedging action between the inner and outer races which locks them into a power transmitting unit, yet allows the driven member to freely overrun the driving member. The assembly employing tiltable sprags is known as a sprag clutch. The freewheel 5 of the torque converter hydraulic circuit shown in FIGS. 1, 5, and 6 performs a holding function for the reaction stator 4 and is generally known as a one way brake. Freewheel units are used in the transmission of this invention to perform both holding and driving functions. Freewheels 26, and 36 hold the gearset reaction members 23, and 33 from rearward rotation in mechanical drive, but also perform a driving function in hydraulic drive, and are overridden in direct drive. Freewheel 16 drives reaction member 13 in hydraulic drive and is overridden in direct drive. Freewheels 18 and 28 perform a holding function between transmission case 8 and reaction drums 19 and 29 and are overridden in hydraulic drive. These actions are fully explained below.

The clutch and governor mechanism of FIG. 3 is also of well known type. The clutch is comprised of an outer drum 51 having splines 56 in its bore and an inner drum 59 having splines 64 on its periphery, both drums being assembled concentrically on the shaft 14. A like assembly is assembled on the shafts 24 and 34 in association with the second and third gearsets. The outer drum 51 has a plurality of clutch plates 55 keyed to the splines 56 in its bore. The inner drum 59 has a plurality of clutch plates 54 assembled on the splines 64 on the periphery of said drum 59. One set of clutch plates, either plates 54 or plates 55 is furnished with a power transmitting surface to prevent galling of the plates during engagement and release, and to provide a long wearing, high power transmitting capacity surface. The plates 54 and plates 55 overlap and interleave within the clutch drums 51 and 59, and are brought together under enough pressure to cause power transmission by the piston 52 being pushed toward pressure plate 58 which is held in the outer drum 51 bore by the snap ring 57. Pressure against piston 52 is supplied by fluid, generally oil, under pressure entering the space between piston 52 and the rear wall of outer drum 51 through passage 62. When the fluid pressure in passage 62 is cut off the piston 52 is pushed back by return spring 60, releasing the driving pressure from plates 54 and plates 55 to allow them to freely pass each other. The governor portion of the mechanism is a piston 70 housed in the bore of governor body 67, said piston 70 having spring 68 tending to force it inward. Fluid under pressure is supplied from a source not shown to the annular groove 71 through passage 63. When the piston 70 is fully pushed in by spring 68 the hole 69 through governor body 67 wall is open to release pressure from clutch piston 52. When the governor 67 is rotated by shaft 14 the piston 70 is forced outward by centrifugal force. The first movement closes relief hole 69. Further movement of piston 70 caused by faster rotation of shaft 14 uncovers pressure supply passage 71 at a predetermined speed controlled by the tension of spring 68. Fluid under pressure then passes through passage 62 to clutch piston 52 and actuates the clutch mechanism as described above. When the rotational speed of governor 67 drops below the predetermined point which uncovers passage 71 spring 68 forces piston 70 inward to close pressure line 62 and uncover release port 69 and relieve fluid pressure on clutch piston 70, thus releasing clutch plates 54 and 55 from driving engagement.

The planetary gearsets of the mechanical power train are arranged in coaxial alignment and housed in a transmission case 8 adapted to hold the gearsets in alignment and provide reaction to the gearsets in mechanical drive. All the gearsets of FIGS. 1, 4, 5, and 6 have carriers numbered 12, 22, and 32. In FIGS. 1 and 4 the carriers 12, 22, and 32 act as transmission output members. In FIG. 5 the carriers 12, 22, and 32 act as transmission input members while in FIG. 6 the carriers 12, 22, and 32 act as gearset reaction members. All the carriers 12, 22, and 32 have a plurality of pinion gears 11, 21, and 31 in FIGS. 1, 4, 5, and 6, and pinion gears 38, 39, and 40 integrally attached to pinions 11, 21, and 31 in FIGS. 5 and 6. All the carriers 12, 22, and 32 have a plurality of pinion gears 11, 21, and 31 or pinion gears 11, 21, and 31 attached to pinion gears 38, 39, and 40, said pinion gears being rotatably mounted in the carriers and equally spaced both radially and circumferentially. In FIG. 1 the pinion gears 11, 21, and 31 are enclosed by and mesh with an internal toothed ring gear 10, 20, and 30 which act as gearset input members. In FIG. 4 ring gears 10, 20, and 30 act as reaction members. In FIG. 1 sun gears 13, 23, and 33 mesh with and are centered by pinion gears 11, 21, and 31 and act as reaction members. In FIG. 4 sun gears 13, 23, and 33 act as input members. In FIG. 5 driven sun gears 13, 23, and 33 mesh with and are centered by driving pinion gears 11, 21, and 31 and act as output members. Reaction sun gears 44, 45, and 46 mesh with and are centered by reaction pinion gears 38, 39, and 40 and act as reaction members. With carriers 12, 22, and 32 acting as reaction members as in FIG. 6 the gearset performs as a simple counter shaft transmission and the gear ratios are determined by dividing driving gear tooth numbers into driven gear tooth numbers of the two pairs of gears then multiplying the quotients. With carriers 12, 22, and 32 driving as in FIG. 5 the gearsets operate in epicycloidal manner and gear ratios are determined as in the arrangements of FIG. 1 and 4. In FIG. 6 the driven sun gears 13, 23, and 33 mesh with driven pinion gears 11, 21, and 31 with which they cooperate to act as gearset input members. Driven sun gears 44, 45, and 46 mesh with driving pinion gears 38, 39, and 40 and co-operate with them to form gearset output members. All of the gearsets have multiple disc clutch means 15, 25, and 35 between two members, said clutch means effecting direct drive in the associated gearsets when engaged. Since all remaining parts of the various figures perform the same function in all figures the description hereafter will be limited to FIG. 1.

The hydraulic power train of the transmission surrounds the mechanical power train and is coaxial therewith. The turbine output sleeve shaft 6 encloses intermediate shaft 7 which transmits power from driving shaft 1 to front gearset input member 10. The intermediate shaft 7 is controlled by clutch 37 which starts the transmission. The reaction drum 9 is used to transmit turbine 3 power to the front gearset reaction member 13 and to transmit turbine 3 power to the following gearset reaction members through disc clutch 17 connecting reaction drum 9 to reaction drum 19 and through disc clutch 27 connecting reaction drum 19 to reaction drum 29. Turbine output sleeve shaft 6 is attached through suitable flange means to reaction drum 9 and is always in driving engagement with front gearset reaction member 13 through freewheel 16, except when multiple disc clutch 15 is engaged to effect direct drive in the front gearset and freewheel 16 is overridden. The reaction drums 19 and 29 also form part of the mechanical power train when disc clutches 17 and 27 are not engaged. Reaction drum 19 is held from rearward rotation by freewheel 18 and reaction drum 29 is held from rearward rotation by freewheel 28. Reaction drum 19 is connected to the reaction member 23 by freewheel 26 and holds said reaction member 23 from rearward rotation in mechanical drive and drives it forwardly in hydraulic drive. Reaction drum 29 is connected to last reaction member 33 by freewheel 36 and holds said reaction drum 29 from rearward rotation in mechanical drive and drives it in hydraulic drive. Freewheel 18 between transmission case 8 and reaction drum 19 is overridden when disc clutch 17 is engaged, and freewheel 28 between reaction drum 29 and transmission case 8 is overridden when disc clutch 27 is engaged.

In starting position the front gearset operates in part mechanical part hydraulic drive and the following gearsets operate in mechanical drive. Power is transmitted by intermediate shaft 7 from driving shaft 1 to front gearset input member 10 when transmission starting clutch 37 is engaged. Input member 10 meshes with and exerts force against pinion gears 11 which mesh with and react against reaction member 13. Reaction member 13 is held from rearward rotation and therefore is driven by freewheel 16 connecting said reaction member 13 to reaction drum 9 which is attached by suitable flange means to turbine 3 driven sleeve shaft 6. Reaction member 13, reaction drum 9, turbine 3 and sleeve shaft 6 may rotate backwards unless the turbine 3 is putting out enough torque to hold the assembly. Unless the reaction member 13 rotates freely backwards the input member 10 will impart some motion to pinion gears 11, causing the output member 12 in which said pinion gears are rotatably mounted on pins to rotate. Intermediate shaft 14 connects the first gearset output member 12 to the second gearset input member 20 and transmits the front gearset power output to the second gearset. Input member 20 meshes with and exerts force against pinion gears 21 which mesh with and react against reaction member 23 which is held from rearward rotation and can be driven by freewheel 16 which is attached to reaction drum 19 which is held from rearward rotation by freewheel 18 attached to the inside of transmission case 8. Input member 20 imparts rotation to pinion gears 21 which rotate on pins mounted in carrier 22 which acts as second gearset output member 22. Intermediate shaft 24 connects output member 22 to last gearset input member 30 and transmits the second gearset power output to last gearset. Input member 30 meshes with and exerts force against pinion gears 31 which mesh with and react against reaction member 33. Reaction member 33 is held from rearward rotation and can be driven by freewheel 36 which is attached to reaction drum 29. Reaction drum 29 is held from rearward rotation by freewheel 28 which is attached to the inside of transmission case 8. Input member 30 imparts motion to pinion gears 31 which rotate on pins mounted in carrier 32. The rotation of pinion gears 31 around inside driving member 30 and outside reaction member 33 causes the output member 32 pins to impart rotary motion to said output member 32. Transmission output shaft 34 is attached to output member 32 and transmits transmission output power to the driven device not shown. The output member 12 and the reaction member 13 of the front gearset are connectable on demand by multiple disc clutch 15 which is controlled by governor 41 riding on intermediate shaft 24. The output member 22 and the reaction member 23 of the second gearset are connectable on demand by multiple disc clutch 25 which is controlled by governor 42 riding on intermediate shaft 24. The output member 32 and reaction member 33 of the last gearset are connectable on demand by multiple disc clutch 35 which is controlled by governor 43 riding on output shaft 34. It is obvious that any combination of gearset members could be connected by the clutches to achieve the same result, namely direct drive in the affected gearset. The clutch 17 is controlled by governor 41 and connects reaction drum 9 to reaction drum 19 on demand. The clutch 27 is controlled by governor 42 and connects reaction drum 19 to reaction drum 29 on demand. The clutches 17 and 27 may be single or multiple disc clutches of large diameter, essentially of the same construction as the clutch of FIG. 3 or, if more convenient or desirable, could be identical in size and dimension to gearset locking clutches 15 and 25 and connected by flange means to their respective reaction drums. When power is transmitted to front gearset input member 10 by engaging clutch 37 the gearset reaction tends to cause reaction member 13 to turn backwards. Normally turbine 3 will put out enough torque to hold the associated sleeve shaft 6, reaction drum 9, freewheel 16 and reaction member 13 so the pinion gears 11 and therefore the output member 12 will start to rotate forward. If turbine 3 only holds reaction member 13 or even allows it to rotate slowly backwards all power transmitted to the torque converter assembly by driving shaft 1 will be wasted. Any increase in speed of driving shaft 1 will cause more power to be transmitted by turbine 3 and reaction member 13 will be accelerated with the result that some turbine power will be converted into motion and will help in turning intermediate shaft 14 which is attached to output member 12. The combined hydraulic and mechanical power output of the front gearset is transmitted by intermediate shaft 14 to second gearset input member 20. Since reaction member 23 is held from rearward rotation by freewheel 26, reaction drum 19 and freewheel 18 anchored to transmission case 8 the power put into the second gearset is mechanically multiplied and transmitted by the output member 22 to intermediate shaft 24 which transmits said power to last gearset input member 30. Since reaction member 33 is held from rearward rotation by freewheel 36, reaction drum 29 and freewheel 28 anchored to the inside of transmission case 8 the power transmitted to the last gearset by intermediate shaft 24 is further mechanically multiplied in the last gearset and is transmitted by output member 32 to transmission output shaft 34. The torque converter turbine 3 will continue to accelerate front gearset reaction member 13 until its speed approaches that of input member 10. Since the mechanical gear ratio in the gearset has dropped as explained above the gearset output member 12 has also been accelerated to near matched speed of input member 10 and output member 12. At a predetermined speed the governor 41 riding on intermediate shaft 14 will admit fluid under pressure to clutches 15 and 17. Clutch 15 locks the front gearset into direct drive and the reaction member freewheel 16 is overridden. Clutch 17 locks the second gearset reaction 19 to front gearset reaction drum 9. This action overrides freewheel 18 and effects part hydraulic part mechanical drive in the second gearset. The turbine 3 will accelerate reaction member 23 to a speed approaching that of input member 20. The gearset passes through an infinite range of gear ratios to near direct drive, then is locked into direct drive when governor 42 admits fluid under pressure to clutch 25. At the same time clutch 27 also receives fluid that actuates it, connecting reaction drum 19 to reaction drum 29. Freewheel 26 is overridden when clutch 25 locks the gearset into direct drive and freewheel 28 is overridden when clutch 27 connects reaction drum 19 to reaction drum 29. Since reaction drum 29 transmits turbine 3 power to reaction member 33 the last gearset operates in part hydraulic part mechanical drive. With slow speed engines and under loads which might cause excessive slip between torque converter impeller 2 and turbine 3 but which the driving shaft 1 will still maintain above the speed at which governor 43 releases fluid pressure to clutch 35, the clutch 35 is shown. When clutch 35 is actuated direct drive is effected in the last gearset and therefore in the whole transmission. Under overload which driving shaft 1 cannot maintain above the speed where governor 43 cuts off fluid to clutch 35 the transmission will change to part hydraulic part mechanical drive in the last gearset. Under still further overload governor 42 will cut off fluid pressure to clutches 25 and 27, effecting part hydraulic part mechanical drive in the second gearset. Under still further overload the governor 41 will cut off fluid pressure to clutches 15 and 17 effecting part hydraulic part mechanical drive in the front gearset, with the following gearsets operating in mechanical torque multiplying drive.

An exception to the direct drive condition in the last gearset when three stage hydraulic torque converters are used, see FIG. 4, should be noted. Three stage torque converters have an efficiency range that is sharply limited at about two-thirds of turbine 3 speed to impeller 2 speed. The turbine 3 speed will not exceed two-thirds of impeller 2 speed if torque requirements of the driven device are equal to or greater than torque input into impeller 2. At no load of turbine driven sleeve shaft 6 power requirements to circulate the fluid about the hydraulic circuit is still a large part of total power requirements of the torque converter under full load. All power put in at no load of output is wasted as heat so it can be seen that if the turbine 3 speed is held down better efficiency will result. The mechanical ratios obtained from a planetary gearset are lower, and therefore require more power to drive the reaction member, at speeds over two-thirds output to input than the torque multiplication ratio of the torque converter. That is at two-thirds turbine 3 speed to impeller 2 speed the torque of the turbine 3 is equal to torque input into impeller 3 while the mechanical ratio of input member 10 to output member 12 of the gearset is 1¼ turns input to one turn output. Therefore the gearset tends to hold the turbine output speed down and the turbine should be connected to the following gearset at about ⅔ output of input speed.

The drawings are shown with three gearsets as a plurality. It is possible to use four or more gearsets if it is so desired. It is also possible and very probably desirable to interchange the various gear arrangements to obtain higher or lower gear ratios in the various gearsets.

What I claim is:

1. In a transmission; a drive shaft, a transmission output shaft, a hydraulic power train and a mechanical power train combined to form a variable speed transmission mechanism adapted to transmit an infinite range of ratios between said shafts, actuating means for said mechanism adapted to establish a sequence of part hydraulic part mechanical ratios and direct drive therein, and control means for said actuating means constructed and arranged to select an infinite range of speed reductions and direct drive by said mechanism; said hydraulic power train including a hydrodynamic mechanism having an impeller, a turbine, and reactor means, said impeller being driven by said drive shaft, said reactor being mounted to prevent reverse rotation and to provide torque multiplying fluid drive between said impeller and said turbine; said mechanical power train including a plurality of planetary gearsets each having an input member, an output member and a reaction member, said gearsets being arranged coaxially and connected together output member of the front gearset to input member of the following gearset, said gearsets being adapted to receive power from said drive shaft into the front gearset input member and to multiply and transmit said power from the front gearset output member to the following gearset input member, and to receive hydraulic power from said turbine into the front gearset reaction member, said hydraulic power effecting an infinite variation of ratios from maximum reduction to direct drive in the front gearset; said actuating means including holding means for said gearset reaction members, power transmitting means adapted to lock two members of each gearset, and power transmitting means adapted to transmit hydraulic power to said gearset reaction members; said control means sequentially controlling said actuating means from front gearset to rear gearset, effecting a scalar changing of said gearsets to direct drive in the front gearset and part hydraulic part mechanical drive in the following gearset.

2. In a hydrodynamic and planetary split torque transmission; a transmission case housing in coaxial alignment a driving shaft, a transmission output shaft, a mechanical power train arranged between said shafts and a hydraulic power train surrounding said mechanical power train, said mechanical power train including a plurality of planetary gearset means, each gearset having an input member, an output member, and a reaction member, power transmitting means connecting said driving shaft to the first gearset input member and power transmitting means connecting each gearset output member to the following gearset input member, said transmission output shaft being attached to the last gearset output member, locking clutch means between two members of each gearset, and mechanical reaction means holding each gearset reaction member, said mechanical reaction means including a plurality of reaction drum means, one of said reaction drums surrounding each gearset, brake means between said transmission case and each of said reaction drums except the first one, and one way clutch means connecting said gearset reaction members to said reaction drum means, said mechanical reaction means allowing said reaction members to rotate freely forward when the associated gearset locking clutch means is engaged; said hydraulic power train including a hydraulic torque converter having impeller, turbine, and reactor means, said impeller being driven by said driving shaft and said reactor means being mounted to prevent rearward rotation, turbine power transmitting means connecting said turbine to the first of said reaction drums, clutch means connecting each of said reaction drums to the following reaction drum, said brake means between said transmission case and said reaction drums being overridden when said reaction drum connecting clutch means is engaged, and control means controlling said gearset locking clutch means and said reaction drum connecting clutch means, said control means effecting direct drive in the affected gearset and part mechanical part hydraulic drive in the following gearsets and effecting a continuously and infinitely variable range of ratios from maximum reduction to direct drive, said control means including centrifugal governors arranged to control said clutch means sequentially from first gearset through the following gearsets.

3. In a hydrodynamic and planetary split torque transmission; a transmission case housing in coaxial alignment a driving shaft, a transmission output shaft, a mechanical power train arranged between said shafts and a hydraulic power train surrounding said mechanical power train, said mechanical power train including a plurality of planetary gearset means, each gearset having an input member, an output member, and a reaction member, power transmitting means connecting said driving shaft to the first gearset input member and power transmitting means connecting each gearset output member to the following gearset input member, said transmission output shaft being attached to the last gearset output member, locking clutch means between two members of each gearset, and mechanical reaction means holding each gearset reaction member, said mechanical reaction means including a plurality of reaction drum means, one of said reaction drums surrounding each gearset except the last one, brake means between said transmission case and each of said reaction drums, and one way clutch means connecting said gearset reaction members to said reaction drum means, said mechanical reaction means allowing said gearset reaction members to rotate freely forward when the associated gearset locking clutch means is engaged; said hydraulic power train including a hydraulic torque converter having impeller, turbine, and reactor means, said impeller being driven by said driving shaft and said reactor means being mounted to prevent rearward rotation, one way clutch means connecting said turbine to the first gearset reaction member and clutch means connecting said turbine to the first and said reaction drums, said one way clutch means between said turbine and first reaction member and said brake means between the first reaction drum and transmission case being overridden when said turbine to first reaction drum connecting clutch is engaged, a plurality of clutch means, one of said clutch means connecting each said reaction drum to the following one, said brake means between said transmission case and said reaction drums being overridden when said reaction drum connecting clutch means is engaged, and control means controlling said gearset locking clutch means and said reaction drum connecting clutch means, said control means effecting direct drive in the affected gearset and part mechanical part hydraulic drive in the following gearset and effecting a continuously and infinitely variable range of ratios from maximum reduction to direct drive, said control means including centrifugal governors arranged to control said clutch means sequentially from first gearset through the following gearsets.

4. In a hydrodynamic and planetary split torque transmission; a transmission case containing in coaxial alignment a driving shaft, a transmission output shaft, a mechanical power train arranged between said shafts, and a hydraulic power train surrounding said mechanical power train, said mechanical power train including a plurality of planetary gearsets each gearset having an input member, an output member, a reaction member, and multiple disc clutch means between two of said gearset members, said multiple disc clutch means effecting direct drive in the associated gearset when engaged, said gearsets each having a ring gear acting as input member, a sun gear acting as reaction member, and a carrier having pinion gears meshing with said ring gear and said sun gear acting as output member, a first intermediate shaft, said intermediate shaft connecting said driving shaft to the first gearset input member, a plurality of intermediate shafts, one of said intermediate shafts connecting each gearset output member to the following gearset input member, a reaction drum surrounding each gearset, one way brake means between said transmission case and each reaction drum except the first one, said one way brake means holding said reaction drums from rearward rotation, one way clutch means between said reaction drums and the enclosed gearset reaction members, said one way clutch means holding said reaction members from rearward rotation, each said reaction member holding one way clutch means being overridden when the associated gearset multiple disc clutch means is engaged, said transmission output shaft being attached to the last gearset output member; said hydraulic power train including a hydraulic torque converter having an impeller, a turbine, reactor means, and a turbine driven sleeve shaft, said impeller being driven by said driving shaft, said reactor being mounted to prevent rearward rotation, and said turbine driven sleeve shaft surrounding said first intermediate shaft, flange means connecting said turbine driven sleeve shaft to the first of said reaction drums, a plurality of disc clutch means, one of said disc clutch means connecting each reaction drum to the following one, the said one way brake means between said transmission case and said reaction drums being overridden when the associated reaction drum connecting disc clutch means is engaged; and a plurality of centrifugally actuated governors, one of said governors riding on each of said gearset connecting intermediate shafts and one riding on said transmission output shaft, said governors each controlling the action of the preceding gearset direct drive multiple disc clutch means and the following gearset reaction drum disc clutch connecting means.

5. In a hydrodynamic and planetary split torque transmission; a transmission case containing in coaxial alignment a driving shaft, a transmission output shaft, a mechanical power train arranged between said shafts and a hydraulic power train surrounding said mechanical power train, said mechanical power train including a plurality of planetary gearsets, each gearset having an input member, an output member, a reaction member, and multiple disc clutch means between two of said gearset members, said multiple disc clutch means effecting direct drive in the associated gearset when engaged, said gearsets each having a sun gear acting as input member, a ring gear acting as reaction member, and a carrier having pinion gears meshing with said sun gear and ring gear acting as output member, a first intermediate shaft, said intermediate shaft connecting said driving shaft to the first gearset input member, a plurality of intermediate shafts, one of said intermediate shafts connecting each gearset output member to the following gearset input member, a reaction drum surrounding each gearset except the last one, one way brake means between said transmission case and each reaction drum, said one way brake means holding said reaction drums from rearward rotation, one way clutch means between each reaction drum and the following gearset reaction member, said one way clutch means holding said gearset reaction members from rearward rotation, each said reaction member holding one way clutch means being overridden when the associated gearset multiple disc clutch means is engaged, said transmission output shaft being attached to the last gearset output member; said hydraulic power train including a hydraulic torque converter having an impeller, a turbine, reactor means, and a turbine driven sleeve shaft, said impeller being driven by said driving shaft, said reactor being mounted to prevent rearward rotation, and said turbine driven sleeve shaft surrounding said first intermediate shaft, one way clutch means between said turbine driven sleeve shaft and the first gearset reaction member and disc clutch means connecting said turbine driven sleeve shaft to the first of said reaction drums, said one way clutch means transmitting turbine output power to the first gearset reaction member, said disc clutch means transmitting turbine output power to the first of said reaction drums when engaged, said one way clutch means between said sleeve shaft and first gearset reaction member and said one way brake means between the first reaction drum and transmission case being overridden when said sleeve shaft to first reaction drum connecting disc clutch means is engaged; a plurality of disc clutch means, one of said disc clutch means connecting each reaction drum to the following one, the said one way brake means between said transmission case and said reaction drums being overridden when the associated reaction drum connecting disc clutch means is engaged; and a plurality of centrifugally actuated governors, one of said governors riding on each of said gearset connecting intermediate shafts and one riding on said transmission output shaft.

6. In a hydrodynamic and planetary split torque transmission; a transmission case containing in coaxial alignment a driving shaft, a transmission output shaft, a mechanical power train arranged between said shafts and a hydraulic power train surrounding said mechanical power train, said mechanical power train including a plurality of planetary gearsets, each gearset having an input member, an output member, a reaction member, and multiple disc clutch means between two of said gearset members, said multiple disc clutch means effecting direct drive in the associated gearset when engaged, said gearsets each having a driven sun gear acting as output member, a reaction sun gear acting as reaction member, and a carrier having a plurality of driving pinion gears meshing with said driven sun gear and a plurality of reaction pinion gears meshing with said reaction sun gear and integrally attached to said driving pinion gears acting as driving member, a first intermediate shaft, said intermediate shaft connecting said driving shaft to the first gearset input member, a plurality of intermediate shafts, one of said shafts connecting each gearset output member to the following gearset input member, a reaction drum surrounding each gearset, one way brake means between said transmission case and each reaction drum except the first one, said one way brake means holding said reaction drums from rearward rotation, one way clutch means between said reaction drums and the enclosed gearset reaction members, said one way clutch means holding said reaction members from rearward rotation, each said reaction member holding one way clutch means being overridden when the associated gearset multiple disc clutch means is engaged, said transmission output shaft being attached to the last gearset output member; said hydraulic power train including a hydraulic torque converter having an impeller, a turbine, reactor means, and a turbine driven sleeve shaft, said impeller being driven by said driving shaft, said reactor being mounted to prevent rearward rotation, and said turbine driven sleeve shaft surrounding said first intermediate shaft, flange means connecting said turbine driven sleeve shaft to the first of said reaction drums, a plurality of disc clutch means, one of said disc clutch means connecting each reaction drum to the following one, the said one way brake means between said transmission case and said reaction drums being overridden when the associated reaction drum connecting disc clutch means is engaged; and a plurality of centrifugally actuated governors, one of said governors riding on each of said gearset connecting intermediate shafts and one riding on said transmission output shaft, said governors controlling the action of the preceding gearset direct drive multiple disc clutch means and the following gearset reaction drum disc clutch connecting means.

7. In a hydrodynamic and planetary split torque transmission; a transmission case containing in coaxial alignment a driving shaft, a transmission output shaft, a mechanical power train arranged between said shafts and a hydraulic power train surrounding said mechanical power train, said mechanical power train including a plurality of planetary gearsets, each gearset having an input member, an output member, a reaction member, and multiple disc clutch means between two of said gearset members, said multiple disc clutch means effecting direct drive in the associated gearset when engaged, said gearsets each having a driving sun gear acting as input member, a driven sun gear acting as output member, and a carrier having a plurality of pinion gears meshing with said driving sun gear and a plurality of driving pinion gears integrally attached to said driven pinion gears and meshing with said driven sun gear acting as reaction member, a first intermediate shaft, said intermediate shaft connecting said driving shaft to the first gearset input member, a plurality of intermediate shafts, one of said intermediate shafts connecting each gearset output member to the following gearset input member, a reaction drum surrounding each gearset except the last one, one way brake means between said transmission case and each reaction drum, said one way brake means holding said reaction drums from rearward rotation, one way clutch means between each reaction drum and the following gearset reaction member, said one way clutch means holding said gearset reaction members from rearward rotation, each said reaction member holding one way clutch means being overridden when the associated gearset multiple disc clutch means is engaged, said transmission output shaft being attached to the last gearset output member; said hydraulic power train including a hydraulic torque converter having an impeller, a turbine, reactor means, and a turbine driven sleeve shaft, said impeller being driven by said driving shaft, said reactor being mounted to prevent reverse rotation, and said turbine driven sleeve shaft surrounding said first intermediate shaft; one way clutch means between said turbine driven sleeve shaft and the first gearset reaction member and disc clutch means connecting said turbine driven sleeve shaft to the first of said reaction drums, said one way clutch means transmitting turbine output power to the first gearset reaction member, said disc clutch means transmitting turbine output power to the first of said reaction drums when engaged, said one way clutch means between said turbine driven sleeve shaft and the first gearset reaction member and one way brake means between said first reaction drum and transmission case being overridden when said sleeve shaft to first reaction drum connecting disc clutch means is engaged; a plurality of disc clutch means, one of said disc clutch means connecting each reaction drum to the following one, the said one way brake means between said transmission case and said reaction drums being overridden when the associated reaction drum connecting disc clutch means is engaged; and a plurality of centrifugally actuated governors, one of said governors riding on each of said gearset connecting intermediate shafts and one riding on said transmission output shaft, said governors being operatively connected to the preceding gearset direct drive multiple disc clutch means and the following gearset reaction drum disc clutch connecting means.

References Cited by the Examiner
UNITED STATES PATENTS

| | | | |
|---|---|---|---|
| 2,627,764 | 2/1953 | Mayner | 74—688 |
| 2,656,736 | 10/1953 | Ebsworth | 74—688 |
| 2,886,983 | 5/1959 | Miller | 74—688 |
| 2,894,415 | 7/1959 | Miller | 74—688 |
| 3,191,459 | 6/1965 | Welch | 74—688 |

FOREIGN PATENTS 1,222,696  1/1960  France.

DAVID J. WILLIAMOWSKY, *Primary Examiner.*

THOMAS C. PERRY, *Examiner.*